(12) United States Patent
Fakhraie et al.

(10) Patent No.: US 11,763,337 B1
(45) Date of Patent: Sep. 19, 2023

(54) SYSTEMS AND METHODS FOR ENABLING THIRD PARTY ENGAGEMENTS AND SERVICES IN HOST PROPERTIES

(71) Applicant: Wells Fargo Bank, N.A., San Francisco, CA (US)

(72) Inventors: Lila Fakhraie, Belmont, CA (US); Jennifer Greene, Novato, CA (US); Christopher J. Hirth, Bell Canyon, CA (US); Ashish B. Kurani, Hillsborough, CA (US); Andrea Renee Leighton, San Francisco, CA (US); Margot Lockwood-Stein, Palo Alto, CA (US); Ronald H. Yang, El Cerrito, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/953,929

(22) Filed: Apr. 16, 2018

Related U.S. Application Data

(60) Provisional application No. 62/614,284, filed on Jan. 5, 2018.

(51) Int. Cl.
*G06Q 30/0207* (2023.01)

(52) U.S. Cl.
CPC .................. *G06Q 30/0236* (2013.01)

(58) Field of Classification Search
None
See application file for complete search history.

(56) References Cited

U.S. PATENT DOCUMENTS

| | | | |
|---|---|---|---|
| 9,439,036 B2* | 9/2016 | Spears et al. | H04L 67/306 |
| 9,721,268 B2* | 8/2017 | Bondesen et al. | G06Q 30/0215 |
| 2012/0022944 A1* | 1/2012 | Volpi | G06Q 30/0255 705/14.53 |
| 2014/0074581 A1* | 3/2014 | Johnson et al. | G06Q 30/02 705/14.33 |
| 2015/0356556 A1* | 12/2015 | Celikyilmaz et al. | G06Q 20/3224 705/14.51 |
| 2016/0180368 A1* | 6/2016 | Booth | G06Q 30/0226 705/14.27 |
| 2018/0137500 A1* | 5/2018 | Greene et al. | G06Q 20/363 |
| 2018/0189273 A1* | 7/2018 | Campos et al. | G06Q 30/016 |
| 2018/0211258 A1* | 7/2018 | Buis et al. | G06Q 20/12 |

OTHER PUBLICATIONS

"Smarter Customer Loyalty Program Management based on Identity less identification leveraging Persona" (Year: 2013).*

* cited by examiner

*Primary Examiner* — Victoria E. Frunzi
(74) *Attorney, Agent, or Firm* — Foley & Lardner LLP

(57) ABSTRACT

A system for providing a third party engagement in a host property is provided. The system includes a user device structured to: provide an indication of an active user session associated with a host property, the host property communicatively coupled to a host property provider computing system; receive a third party engagement based on a trigger activated during the active user session, the trigger structured to generate the third party engagement; provide, via a graphical user interface comprising the host property, the third party engagement based on the trigger activated; and receive an indication of activation of the third party engagement.

12 Claims, 3 Drawing Sheets

SYSTEMS AND METHODS FOR ENABLING THIRD PARTY ENGAGEMENTS AND SERVICES IN HOST PROPERTIES

CROSS REFERENCE TO RELATED APPLICATION

This application claims the benefit of U.S. Provisional Pat. Application No. 62/614,284 entitled "SYSTEMS AND METHODS FOR ENABLING THIRD PARTY ENGAGEMENTS AND SERVICES IN HOST PROPERTIES," filed Jan. 5, 2018, which is incorporated herein by reference in its entirety.

TECHNICAL FIELD

The present disclosure relates to intelligently and strategically integrating third party communications into host party properties.

BACKGROUND

People engage with various merchants daily. Many merchants provide loyalty programs where repeat engagements with that merchant enable the customer to earn various rewards (e.g., points, etc.). However, enrollment in these loyalty programs is typically burdensome to the customer. For example, the customer must register by providing their name, address, a username, a password, answers to one or more security questions, and perhaps even more information. To then access their loyalty account, the customer must provide various credentials, such as their username and password, which may be bothersome if the customer has multiple loyalty accounts with multiple credentials. Accordingly, better loyalty program engagements are desirable.

SUMMARY

One embodiment relates to a system for providing a third party engagement in a host property. The system includes a user device. The user device is structured to: provide an indication of an active user session associated with a host property, the host property communicatively coupled to a host property provider computing system; receive a third party engagement based on a trigger activated during the active user session, the trigger structured to generate the third party engagement; provide, via a graphical user interface comprising the host property, the third party engagement based on the trigger activated; and receive an indication of activation of the third party engagement.

Another embodiment relates to a system for providing a third party engagement in a host property. The system includes a provider computing system communicatively coupled to a user device, the provider computing system structured to: receive an indication of an active user session in a host property; determine a trigger is activated during the active user session, the trigger structured to generate a third party engagement; and generate the third party engagement based on the trigger activated, wherein the third party engagement is provided from within the host property.

Still another embodiment relates to a computer implemented method of providing a third party engagement in a host property. The method includes: receiving an indication of an active user session in a host property; determining a trigger is activated during the active user session, the trigger structured to facilitate generation of a third party engagement; generating the third party engagement based on the trigger activated; and providing the third party engagement from within the host property to a user of the host property.

These and other features, together with the organization and manner of operation thereof, will become apparent from the following detailed description when taken in conjunction with the accompanying drawings.

DETAILED DESCRIPTION

Figure 1:
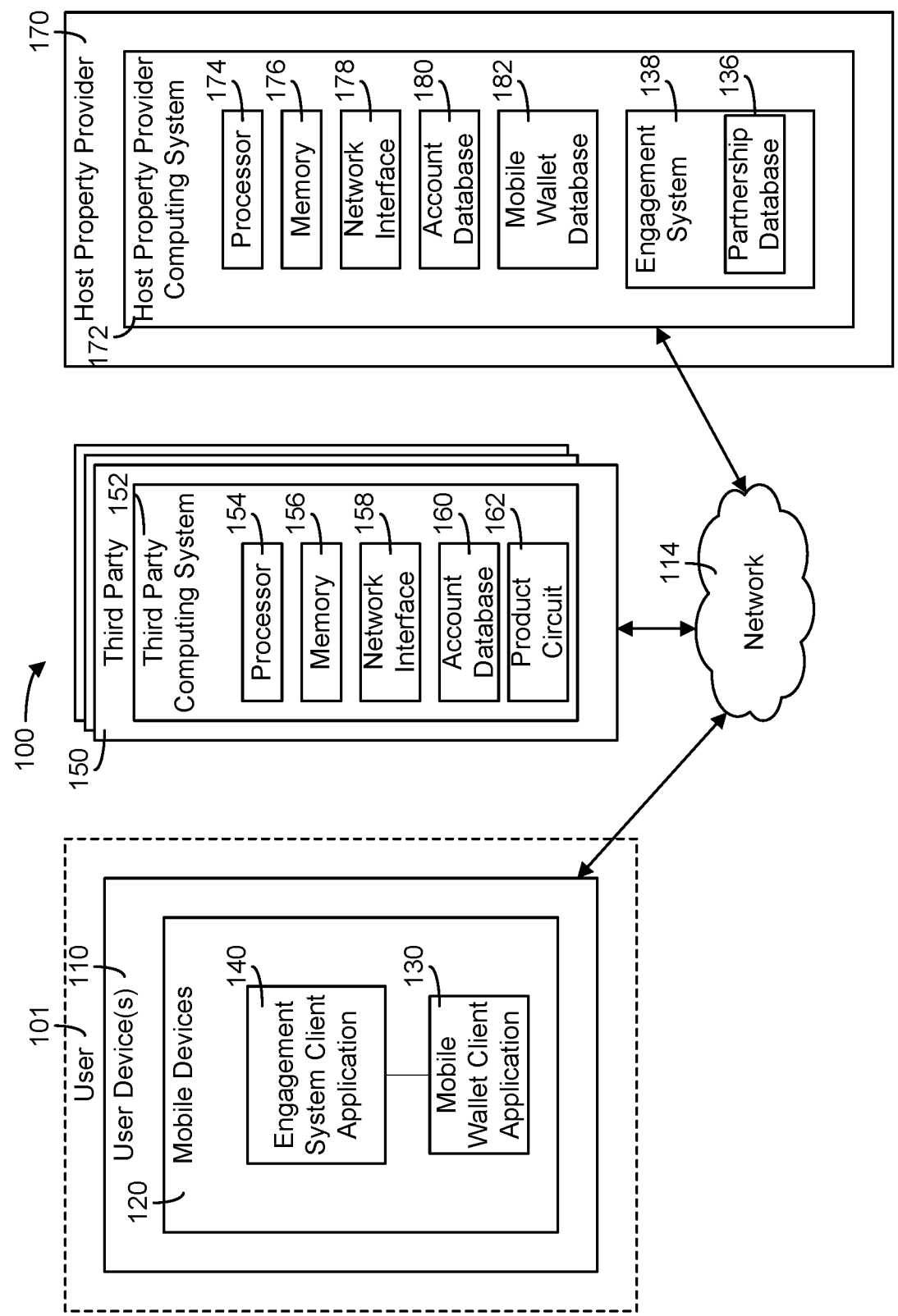
FIG. 1 is a block diagram of a computing system according to an example embodiment.

Referring to the Figures generally, systems and methods of providing a third party engagement in a host property are described herein. As used herein, the term "third party engagement" refers to a communication (e.g., notification, etc.) regarding a product or service offering that is provided within the context of a host property (e.g., an application running on a mobile device) to enable an enrollment or obtainment of that product or service from within the host property such that the user does not need to go off-property (e.g., to a property, such as a website, associated with the third party) to receive, obtain, or otherwise get that product or service. For example, a host property may be a mobile wallet application provided by a first entity, while the third party engagement is an offer for a cleaning service that is provided to the user by a second entity while the user is in or using the mobile wallet application. In this regard, the communication for a product or service may also include, but is not limited to, an offer for a stored value card (e.g., a gift card), an offer for a loyalty card (or, more generally, to join a loyalty program), and the like. The system includes a user device (e.g., a mobile device, wearable, etc.) that provides a host property. The system further includes an engagement system associated with an engagement system client application that is included with the user device. The engagement system is structured to receive an indication of an active user session in the host property (i.e., that the user is using or in the host property); determine whether a trigger is activated during the active user session; and generate the third party engagement based on the trigger activated. The engagement system is further structured to provide the third party engagement to a user via the user device.

The embodiments and implementations of the systems and methods disclosed herein improve current computing systems by facilitating the provision of a third party engagement in a host property. As described herein, the engagement system improves authentication of computing systems. Using the engagement system, the identity of a person may be verified to prevent fraudulent activity and to ensure that each person who interacts with a host property operates under the proper security roles and permissions. These systems, methods, and computer implementations improve such computing systems by facilitating the provision of third party engagement in a host property without requiring the entry of account information during an engagement with the third party provider during an active user session using the host property. Without such requirements, the clock time, processing time, programmatic instructions required to authenticate a user account, and other requirements of the central processing unit, memory utilization, and other system resources are reduced. Accordingly, authentication computing and system security are improved by providing the ability to identify and verify a user of a host property based on an application associated with the provider institution computing system such that the provision of additional identification information or account information by the user is not required.

These systems, methods, and computer implementations improve such computing systems by facilitating the provision of third party engagements in host properties. Advantageously, these systems, methods, and computer implementations enable a user to stay within a host property (e.g., a host application) while selectively enrolling in third party product and/or service from the host property. As such, the systems, methods, and computer implementations disclosed herein improve the functioning of such systems and information management by providing functionalities that are novel and non-obvious improvements over current systems.

Referring now to FIG. 1, a block diagram of a computing system 100 is shown according to an example embodiment. As described herein, the computing system 100 facilitates third party engagements with a host property without a user having to leave or exit the host property (e.g., an application running on a user device). As shown, the computing system 100 includes one or more user devices 110 associated with a user 101, one or more third parties 150 that are associated with a third party computing system 152, and a host property provider 170 having or associated with a host property provider computing system 172. The components of FIG. 1 may be communicably and operatively coupled to each other over a network 114. The network 114 may be any type of type of network. For example, the network 114 may be a wireless network interface (e.g., 802.11X, ZigBee, Bluetooth, Internet, etc.), a wired network interface (e.g., Ethernet), or any combination thereof. The network 114 is structured to permit the exchange of data, values, instructions, messages, and the like between and among the user device 110, the third party computing system 152, and the host property provider computing system 172.

The host property provider 170 refers to an entity that provides one or more host properties. As used herein, "host properties" refer to applications that run on a user device 110 (described below). Thus, the "host property" may be a mobile application when the user device 110 is a mobile device 120. When the user device 110 is a predominately fixed device (e.g., a desktop computer), the "host property" is a desktop application. In the example depicted, the host property provider 170 is a financial institution capable of providing one or more financial products and services (e.g., banking (e.g., the providing of various accounts, such as a demand deposit account), lending, money transfers, issuing credit and/or debit cards, wealth management, and so on). Thus, the associated host property provider computing system 172 is structured to provide or otherwise facilitate providing the one or more financial products and services to customers. As such, the financial institution may provide banking services to the customers. For example, customers can deposit funds into accounts, withdraw funds from accounts, transfer funds between accounts, view account balances, and the like via the provider computing system 172. As described herein, the computing system 172 is structured to facilitate the provision of a third party engagement in a host property. In this regard, the host property provider computing system 172 is a backend computer system that supports the user device 110 and other services offered by the provider, e.g., financial services offered by the provider institution.

As shown, the host provider computing system 172 includes a processor 174 and a memory device 176. The processor 174 may be implemented as a general-purpose processor, an application specific integrated circuit (ASIC), one or more field programmable gate arrays (FPGAs), a digital signal processor (DSP), a group of processing components (e.g., servers), or other suitable electronic processing components. The one or more memory devices 176 (e.g., RAM, ROM, NVRAM, Flash Memory, hard disk storage, etc.) may store data and/or computer code for facilitating at least some of the various processes described herein. In this regard, the memory 176 may store programming logic that, when executed by the processor 174, control the operation of the host property provider computing system 172.

As shown, the host property provider computing system 172 also includes a network interface 178. The network interface 178 facilitates the sending and receiving of data, information, and/or communications over the network 114 (e.g., to and from the user device 110, etc.). As mentioned above, in this example, the host property provider 170 is structured as a financial institution. As such, the host property provider computing system 172 may also include an account database 180 that stores customer information and account information relating to accounts held with the financial institution. As further shown, the financial institution computing system 172 may include a mobile wallets account database 182 for storing mobile wallet accounts of users. As described herein below, the mobile wallet accounts may permit payments via the mobile wallet client application 130.

The account database 180 is structured to maintain accounts associated with customers of the provider 170 and to facilitate transactions associated with the accounts. The account database 180 may store transaction data and account information, including account numbers, account balances, customer contact information, customer preferences, and other account information. As used herein, the term "transaction data" may be used to refer to data associated with a transaction including, but not limited to, a payment, expense, debit, credit, contribution, donation, etc. which may be associated with the account of a user of the provider 170.

The mobile wallet database 182 is structured to store information regarding mobile wallet accounts held by various users, such as for a mobile wallet account held by the user of the user mobile device 110. For instance, the mobile wallet database 182 may store various forms of information related to the user and/or an associated mobile device upon registration of one or both for a mobile wallet. The stored mobile wallet account information may include authentication information (e.g., username/password combinations, device authentication tokens, security question answers, etc.), payment card information, and transaction history, account holder identifying information, registered device information, and any other information that may be encountered in the operation of a mobile wallet account or otherwise referenced herein. Such information may include user preferences and other information comprising a user profile. In some arrangements, for example, mobile wallet database 182 also includes or is coupled to a token vault. The token vault may include a lookup table maintaining tokens associated with various user payment vehicles. The tokens stored therein may be generated internally (e.g., at the host property provider computing system 172) or by other entities (e.g., a token service provider computing system). For example, in one embodiment, the token vault may include a lookup table including tokens that that have been randomly assigned to a user payment vehicle (e.g., user lines of credit, user checking accounts, and the like). In some arrangements, the computing system 172 may include an associated token management system (not shown) including one or more algorithms, processes, formulas, etc. that facilitate the efficient searching of the information stored in the token vault. For example, a mapping algorithm may be utilized to map Token-to-PAN information. Thus, when a token is received, the mapping algorithm determines the associated PAN and sends that information to the issuer. In some arrangements, the token vault is provided at a computing system associated with a separate entity.

The engagement system 138 refers to one or more server, processing, memory or storage, network, and the like components that may at least partly support the engagement system client application 140 that may be downloaded and run on the user device 110. In the example shown, a partnership database 136 is included with the engagement system 138. The database 136 is structured to store information relating to the partnerships established: for example, the products offered by one or more third parties 150, conditions for use associated therewith, and any other information relating to the third party(ies). In this regard, the database 136 may store the pre-generated one or more products from them the third parties 150, such that the engagement system client application 140 can easily and readily offer and activate such product(s). Therefore, in operation, the engagement system 138 may at least partially support some of the activities described herein with respect to the engagement system client application 140.

The computing system 100 also includes one or more third parties 150 owning, operating, or otherwise associated with one or more third party computing systems 152. The third parties refer to one or more persons, groups of persons, or entities that are a third party relative to the host property provider (i.e., in this example, the financial institution). The third parties 150 may offer one or more products or services. In the example depicted, the third parties 150 refer to merchants (e.g., Walgreens, etc.). The merchants may sell various products (e.g., household goods, car parts, etc.). The merchants may also offer a loyalty or rewards program. The loyalty program provides benefits to repeat customers. For example, the more a user spends while shopping at a merchant, the more points that are earned by the user which can be converted into some form of useful currency (e.g., a gift card, cash redemption, a gift, a voucher, etc.). The merchant may provide a loyalty card to a user, which is associated with the loyalty account of the user at that merchant. The loyalty card can be swiped, dipped, and/or tapped at the merchant POS or the card number numerically entered at the merchant's website, in order for the rewards to be tracked to the customer's account associated with the loyalty card.

As shown, the third party computing system 152 includes a processor 154, a memory device 156, a network interface 158, an account database 160, and a product circuit 162. All of these components may be communicably and operatively coupled to each other. The processor 154, memory device 156, and network interface 158 may have the same structure and function as described herein with respect to the processor 174, memory 176, and network interface 178 of the host property provider computing system 172.

The product circuit 162 is structured to provide one or more products to the engagement system 140 to enable the third party engagement. Thus, the product circuit 162 may serve as a memory database or repository of products that are offered by the third party (i.e., merchant). For example, the product circuit 162 may store electronic versions of loyalty cards, electronic versions of stored value cards (e.g., gift cards), information regarding products or services offered by the merchant (e.g., car parts, etc.), and so on. The product circuit 162 may provide or otherwise facilitate provisioning of the one or more products via the network interface 158 over the network 114 to the engagement system 140.

The user 101 may have or be associated with a user device 110. The user 101 may include individuals, business representatives, large and small business owners, and any other entity/person. In some configurations, the user 101 may have a financial account at the financial institutions 140 of the system 100. The user device 110 may be or include a mobile device 120 (i.e., a device that is substantially portable or movable as opposed to a stationary or fixed device). The mobile device 120 may include a wearable device. Wearable devices refer to any type of device that a user wears including, but not limited to, a watch (e.g., a smart watch), glasses (e.g., eye glasses, sun glasses, smart glasses, etc.), bracelet (e.g., a smart bracelet), etc. Mobile devices 120 may also include any type of mobile device of a user 101 including, but not limited to, a phone (e.g., a smartphone, etc.) and a computing device (e.g., a tablet computer, a laptop computer, a person digital assistant, etc.). Mobile devices 120 may also include voice-activated digital assistance devices (e.g., a voice activated device structured to assist a user, smart speakers having chat bot capabilities, etc.), portable media devices, vehicle infotainment systems, etc. that may access one or more programs, servers, networks, central computers, etc. Accordingly, the user device 110 may include a display device (e.g., a screen) and one or more input/output devices (e.g., a touch screen, microphone, speaker, keyboard, etc.). In the example depicted, the mobile device 120 is structured as a smartphone.

In this example, the user device 110 includes an engagement system client application 140 coupled to a mobile wallet client application 130. Thus, in this example, the mobile wallet or mobile wallet application is the "host property." Of course, in other arrangements, a different host property may be contemplated and utilized (e.g., a mobile banking client application, a bill pay client application, a peer-to-peer payment application, a non-financially related client application, and so on). The engagement system client application 140 and mobile wallet client application 130 may be server-based applications executable on the user device 110. In this regard, a user may have to first download the application(s) prior to their usage. In another embodiment, the engagement system client application 140 and mobile wallet client application 130 may be hard coded into the memory of the user device 110. In an alternative embodiment, the engagement system client application 140 and mobile wallet client application 130 may be web-based interface applications. In this configuration, the user may have to log onto or access the web-based interface before usage of the application(s). The engagement system client application 140 and mobile wallet client application 130 may be at least partly supported by a separate computing system comprising one or more servers, processors, network interface modules, etc. that transmit the applications for use to the user device 110. In yet another alternative embodiment, the mobile wallet client application 130 and the engagement system 140 may include their own set of dedicated hardware components or substantially dedicated hardware components and associated logic. To facilitate integration, the engagement system client application 140 and mobile wallet client application 130 may include an application programming interface (API) and/or a software development kit (SDK) that facilitate the integration of other applications with at least one of the engagement system 140 and mobile wallet client application 130. All such variations and combinations are intended to fall within the spirit and scope of the present disclosure.

The mobile wallet client application 130 may be communicably coupled to the host property provider computing system 172 (e.g., the mobile wallets database 182) via the network 114 and may be structured to facilitate purchases by the user via the mobile wallet client application 130. Accordingly, the mobile wallet client application 130 may be linked or otherwise connected with one or more accounts of the user. In this regard and as described above, the mobile wallet client application 130 may be at least partly supported by the host property provider computing system 172. In operation, when at a point-of-sale terminal, a user may open the mobile wallet client application 130 and provide a passcode (e.g., biometrics such as a thumbprint, a personal identification number (PIN), a password, etc.) to authenticate the person and select the source payment account desired (e.g., a checking account from a particular financial institution that is linked to the mobile wallet client application 180). Via communication with the payment terminal (e.g., via near field communication, Bluetooth, etc.), the aforementioned payment information may be provided and the payment processed. Beneficially, carrying payment cards may be avoided or reduced via the mobile wallet client application 130.

The mobile wallet client application 130 is structured to permit mobile wallet users to engage in transactions through the initiation of communications with, for example, a merchant point of sale device. In this regard, the mobile device 120 may include a near field communications (NFC) chip and an associated controller that configures the chip to exchange information with the merchant point of sale device (e.g., an NFC reader). It should be understood that the role that the mobile wallet client application 130 takes in payment transactions will depend on the implementation of the mobile wallet. In some arrangements, for example, the mobile wallet is implemented in a secure element framework. In such arrangements, the user mobile device 120 includes a secure element that is separate from the main system memory of the user mobile device. The secure element may include any element having smart card functionalities, such as a universal subscriber identity circuit (a SIM card) or a secure digital card. In various other arrangements, the user-specific payment information may be stored in a trusted execution environment ("TEE") within a processor the user mobile device 120. In these arrangements, user authentication information (e.g., payment vehicle information, user PINS, and the like) is stored in the secure element. In various arrangements, the secure element of the mobile device 120 may include a payment application that interfaces with the NFC chip of the user device responsive to receiving a communication (e.g., an application protocol data unit) from the merchant point of sale device to enable user payment information (e.g., a token) be transferred. In such arrangements, no user information is transferred by the mobile wallet client application 130 to the NFC chip. After user payment information is transmitted to the merchant point of sale device, the mobile wallet client application 130 may query the secure element for transaction data to notify the user of the completed transaction.

In other arrangements and in the example depicted, the mobile wallet client application 130 may operate under a host card emulation framework. In such arrangements, user payment information is maintained within the mobile wallet client application 130 or cloud-based environment (e.g., a host emulation service or the mobile wallet database 182) rather than in the secure element. The user payment information refers to the tokenized payment card information, which was described above. Thus, sensitive payment information is not stored by the mobile device or application to improve security of this information. In operation, the mobile wallet client application 130 may include a service component (e.g., a payment application) configured to interface with the NFC chip of the mobile device 120 to communicate user payment tokens to the merchant point of sale device.

In some arrangements, the mobile wallet client application 130 is structured to enable the user to manage a mobile wallet. In this regard, the mobile wallet client application 130 is structured to present, control, and otherwise manage displays or graphical user interfaces on the mobile device 120 including information pertaining to various payment vehicles. For example, the mobile wallet client application 130 may present the user with displays enabling the user to input information pertaining to various payment vehicles. The screens may enable the user to manually input information (e.g., a PAN) pertaining to a payment vehicle, or enable the user to take a picture of a payment vehicle. The mobile wallet client application 130 may then process the information input by the user, identify account information, and transmit the information to the computing system 172 for storage (e.g., in the mobile wallet database 182 in association with the user). Once information pertaining to various payment vehicles has been received by the computing system 172, the mobile wallet client application 130 is configured to present displays that enable the user to select a payment vehicle from amongst a plurality of payment vehicles. Once a payment vehicle is selected, the displays may further enable the user to perform various actions using the selected payment vehicle (e.g., use the selected vehicle to complete a mobile wallet transaction, manage an account at a financial institution associated with the selected payment vehicle, view a transaction history associated with the payment vehicle, and the like).

As shown, the engagement system client application 140 is embodied with the user device 110, and supported at least partly by the engagement system 138 of the host property provider computing system 172. In this regard, the engagement system client application 140 may be structured as a thin client application that is executable by a processor of the user device 110. Accordingly, as will be appreciated by those of ordinary skill in the art, the description of the engagement system client application 140 in regard to the user device 110 is not meant to be limiting as parts thereof may also be included with the computing system 172 (e.g., engagement system 138). With the above in mind and in the example depicted, the mobile wallet application 130 as well as the engagement system 140 are configured as downloadable applications configured or structured to run on the user device 110.

Figure 2:
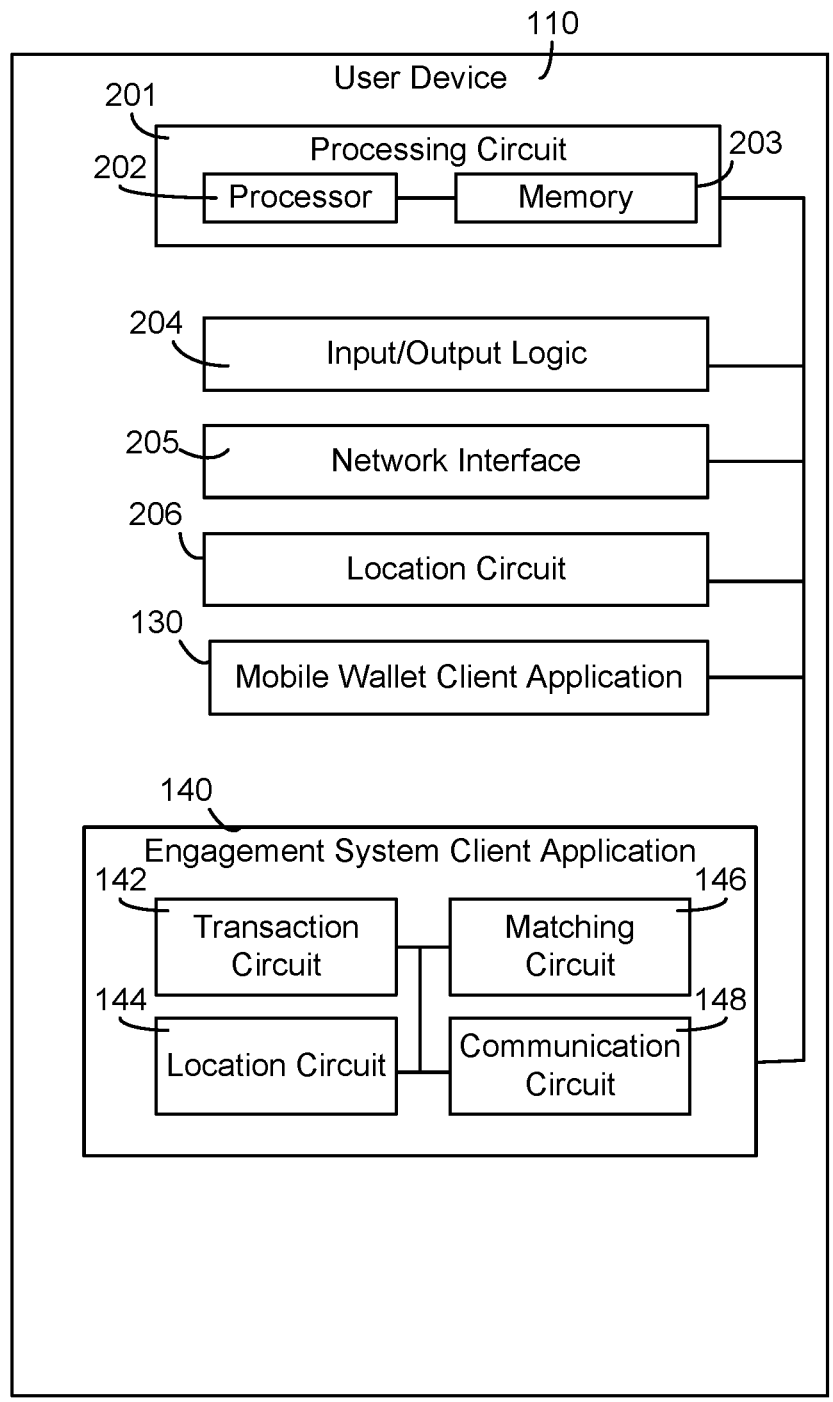
FIG. 2 is a block diagram of a user device according to an example embodiment.

Referring now to FIG. 2, a block diagram of the user device 110 is shown according to an example embodiment. As mentioned above, in this example, the user device 110 is a mobile device 120 that is structured as a smartphone. The user device 110 includes a processing circuit 201 having a processor 202 and one or more memory devices 203. The processor 202 may be implemented as a general-purpose processor, an application specific integrated circuit (ASIC), one or more field programmable gate arrays (FPGAs), a digital signal processor (DSP), a group of processing components that may be distributed over various geographic locations in the user device, or other suitable electronic processing components. The one or more memory devices 203 (e.g., RAM, NVRAM, ROM, Flash Memory, hard disk storage, etc.) may store data and/or computer code for facilitating at least some of the various processes described herein. The one or more memory devices 203 may be or include tangible, non-transient/non-transitory computer readable medium, volatile memory or non-volatile memory. Accordingly, the one or more memory devices 203 may include database components, object code components, script components, or any other type of information structure for supporting at least some of the various activities and information structures described herein.

The user device 110 is shown to include various circuits and logic for completing at least some of the activities described herein. More particularly, the user device 110 includes input/output logic 204, a network interface 205, a location circuit 206, the mobile wallet client application 130, and the engagement system client application 140. While various circuits, interfaces, and logic with particular functionality are shown in FIG. 2, it should be understood that the user device 110 may include any number of circuits, interfaces, and logic for completing the functions described herein. For example, the activities of multiple circuits may be combined as a single circuit, as additional circuits with additional functionality may be included, etc.

The network interface 205 is adapted for and structured to establish a communication session via the network 114 with at least one of the host property provider computing system 172 and the third party computing system 152. Accordingly, the network interface 205 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Further, the network interface 205 may include cryptography capabilities to establish a secure or relatively secure communication session with the at least one host property provider computing system 172. In this regard, data may be encrypted to prevent or substantially prevent the threat of hacking.

The input/output logic 204 may be structured to receive and provide communication(s) to a user of the device 110 (or, to another entity such as the host property provider computing system 172). In this regard, the input/output logic 204 may be structured to exchange data, communications, instructions, etc. with an input/output component of the device 110. Accordingly, in one embodiment, the input/output logic 204 may include an input/output device such as a display device, a touchscreen, a keyboard, and a microphone. In another embodiment, the input/output logic 204 may include communication circuitry for facilitating the exchange of data, values, messages, and the like between an input/output device and the components of the user device 110 (e.g., the engagement system client application 140). In yet another embodiment, the input/output logic 204 may include machine-readable media for facilitating the exchange of information between the input/output device and the components of the user device 110. In still another embodiment, the input/output logic 204 may include any combination of hardware components (e.g., a touchscreen, speakers, keyboards, notification LEDs, microphones, buttons, switches, cameras, and so on), communication circuitry, and machine-readable media.

The location circuit 206 may be structured to receive or acquire location data, and determine a location of the user device 110 based on the location data. In one embodiment, the location circuit 206 may include a global positioning system (GPS) or any other type of location positioning system. As such, the location circuit 206 may receive latitude data, longitude data, and any other type of location or position data to determine the location of the user device 110. In other embodiments, the location circuit 206 may receive an explicit location identification from the user of the device 110. All such variations are intended to fall within the spirit and scope of the present disclosure.

As mentioned above, the mobile wallet client application 130 may be structured to facilitate and permit payments by interfacing with an account (e.g., a checking account) held by the user at a financial institution. Accordingly, the mobile wallet client application 130 may be communicably coupled via the network interface 205 over the network 114 to the computing system 172.

While not shown, the user device 110 includes a power source. The power source may include grid power, battery power (e.g., alkaline batteries, rechargeable batteries, etc.), and/or another energy source. As being configured as a smartphone, the user device includes circuitry structured to recharge the battery (i.e., the power source).

Turning now to the engagement system client application 140, as described herein, the engagement system client application 140 is structured to enable, provide, or otherwise facilitate third party engagements with host properties. As shown, the engagement system client application 140 includes a transaction circuit 142, a location circuit 144, a matching circuit 146, and a communication circuit 148. As mentioned above and in the example depicted, the engagement system client application 140 is structured as a downloadable application configured or structured to run on the user device 110. As such, the transaction circuit 142, location circuit 144, matching circuit 146, and communication circuit 148 are embodied as machine or computer-readable media that is executable by a processor, such as the processor 202. As described herein and amongst other uses, the machine-readable media facilitates performance of certain operations to enable reception and transmission of data. For example, the machine-readable media may provide an instruction (e.g., command, etc.) to, e.g., acquire data from a particular a physical sensor or a virtual sensor. In this regard, the machine-readable media may include programmable logic that defines the frequency of acquisition of the data (or, transmission of the data). The computer readable media may include non-transitory computer readable media, such as code, which may be written in any programming language including, but not limited to, Java or the like and any conventional procedural programming languages, such as the "C" programming language or similar programming languages. Of course, in other embodiments and as described above, the circuits of the engagement system client application may be hardware components or a combination of hardware and logic components. For example, the circuits of the engagement system 140 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." Both variations are intended to fall within the scope of the present disclosure.

The functionality of the user device 110 may be controlled at least in part by the engagement system client application 140. The engagement system client application 140 is structured to manage the provisioning/providing of a third party engagement in a host property to a user.

The transaction circuit 142 is structured to receive and/or acquire transaction data regarding transactions of the user 101. Through coupling with the mobile wallet client application 130, the transaction circuit 142 may receive transaction data regarding mobile wallet purchases/transactions. The transaction data regarding the mobile wallet purchases may include a determination of merchants frequented, transaction amounts, transaction dates, transaction locations, refund transactions, and any other information relating to the mobile wallet transactions. As mentioned above, transaction data may also include non-mobile wallet transactions as well, such as a payments, expenses, debits, credits, contributions, donations, etc. which may be associated with the account(s) of a user of the provider institution 170. As mentioned above, in this embodiment the host property provider 170 is a financial institution, such that the financial institution may have information stored in its account database 180 regarding the non-mobile wallet transaction information. Thus, the transaction circuit 142 may selectively ping, communicate, or otherwise request and receive transaction data regarding mobile wallet and non-mobile wallet transactions. For example, the transaction circuit 142 may ping the account database 182 directly or indirectly via the engagement system 138. Using the intermediary of the engagement system 138 may be beneficial in providing an extra layer of security.

The location circuit 144 is structured to receive and/or acquire location data regarding the location of the user device 110. For example, the location circuit 144 may receive location data from the location circuit 206. As another example, the location data may be provided from a separate device from the user device 110. For example, various user devices may be coupled to the engagement system 138, such that location data acquired from each of those devices may serve as source location data for the circuit 144 (e.g., location data from the user's wearables and the mobile device). As such, one or more patterns may be determined by the location circuit 144 regarding the activities of the user 101. The location circuit 144 may utilize artificial intelligence to determine predicted locations of the user 101 as well. This location data and predictive analytics may be used to ascertain preferences of the user, such as where they like to frequent/visit and shop.

The matching circuit 146 is structured to match one or more products offered by one or more third parties 150 to the user 101 based on at least one of the analyzed transaction data from the transaction circuit 142, the location data from the location circuit 144, real-time transactions, and/or a combination thereof. Thus, in operation, a partnership is established between the host property provider 170 and one or more third parties 150. Alternatively or additionally, a non-partnership is established between the host property provider 170 and one or more third parties 150. In either situation, the matching circuit 146 is provided with at least partial access to third party computing system 152, and particularly, the product circuit 162. As a result, the matching circuit 146 is provided access to the products offered by the one or more third parties 150, which are maintained and provided by the product circuit 162. Alternatively, the product circuit 162 may provide one or more products to the partnership database 136, such that the matching circuit 146 has access to the one or more products in this manner rather than access the product circuit 162 third party computing system 152 generally.

At least one of the third parties 150 or the host property provider 170 may provide one or more terms and conditions for the one or more products to define an offering condition. The offering condition dictates when the one or more products may be offered to the user 101. For example, an offering condition may be that a predefined number of transactions at a merchant must occur (e.g., three) before their product, such as a loyalty card, is offered the user. As another example, the host property provider 170 prioritizes various products from various third parties (e.g., merchants) over others due to the terms of their agreement/partnership. For example, if third party A has paid more to partner with the host property provider 170, their products may be prioritized over third party B.

In operation, the matching circuit 146 may firstly determine which products are offered by which third parties. This information may be stored by the partnership database 136 of the engagement system 138. In one embodiment, the matching circuit 146 queries the partnership database 136 to retrieve relevant partnership information (e.g., identity of products and merchants or third parties, etc.). The received information may be stored by the engagement system 140 (e.g., in the memory 203 of the user device 110). In another embodiment, rather than requesting for information, partnership and product information may be pushed periodically from the partnership database 136 of the engagement system 138 to the matching circuit 144. The pushed information may be stored in a memory device of the user device (e.g., memory 203). Such a configuration may be beneficial to enable real-time or substantially real-time matches of products to user. In either event, the matching circuit 146 establishes a knowledge of products offered by the third parties.

Notwithstanding the presence of absence of one or more offering conditions, the matching circuit 146 is structured to identify and match one or more products from one or more third parties based on at least one of location data, transaction data, real-time transactions, and/or a combination thereof. For example, transaction data may indicate that the user 101 frequents merchant X at least once a week. Accordingly, the matching circuit 146 may query the partnership database 136 of the engagement system 138 to determine if i) merchant X is in the system, and ii) merchant X offers a product. Or, as mentioned above, the matching circuit 146 may have this information such that the identification can be done in real or substantially real time. Assuming there is no prohibitive offering condition, the matching circuit 146 may determine that merchant X does offer a product that may be of interest to the user 101. As such, the matching circuit 146 determines that because of the frequency which the user 101 shops at merchant X, the user 101 may be interested in one or more products from merchant X.

The matching may also be performed based on location data. For example, the user 101 may frequent various merchant locations repeatedly (e.g., weekly, as indicated by the location data for the past three weeks). While the user 101 does not shop at those locations such that the transaction data alone may not provide an indication of a product match, the location data may be sufficient for the matching circuit 146 to determine that the user 101 may be interested in one or more products are offered by the merchants associated with the locations. Beneficially, this analysis may enable the user 101 to begin shopping at those merchants. For example, the product may be a stored value card that would provide the user the ability to purchase a good that is normally too pricey for them to consider. As a result, this product — the stored value card — may be used to initiate a relationship between the user and that particular merchant. The matching may also be based on some combination of location and transaction data.

While the matching circuit 146 is structured to identify various third parties (e.g., merchants) that may offer products of interest to the user 101, the matching circuit 146 is also structured to identify particular products of interest to the user 101. For example, the transaction data may indicate that a user visits a particular merchant at least once week. Due to this repeated engagement, the matching circuit 146 may determine that a loyalty card associated with that merchant that enables the user to earn rewards for shopping at that particular merchant may be the most appropriate product. As another example, the location data may indicate that a user frequents a particular merchant several times a month but seldom purchases a good from that merchant based on the transaction data. Additionally, the matching circuit 146 may determine that the product offered by that merchant includes loyalty cards and stored value cards. Rather than simply identifying a loyalty card as the product for the user, the matching circuit 146 determines that a stored value card may be more appropriate because the stored value card may help the user shop more frequently at that merchant.

Thus, the matching circuit 146 is structured to identify particular third parties 150 and particular / specific products offered by those third parties that may be of interest / most appealing to the user 101. It should be understood that the matching circuit 146 may include one or more matching algorithms, weighting processes, cross-referencing tables (e.g., look-up table(s)), and the like to enable this matching.

The communication circuit 148 is structured to communicate the determined matches to the user 101. More particularly, the communication circuit 148 is structured to communicate or provide the identified matches (i.e., products) to the user 101 from within the host property. In the example depicted, the communication circuit 148 is structured to communicate the match - i.e., product - when the user is in the mobile wallet client application 130. The communication may be provided as a pop-up in the client application 130. The communication may be provided as a push notification sent via the client application, which may show up on the user's lock screen of the mobile device 120. Thus, the communication circuit 148 may control certain components of the user device 110 (e.g., a speaker, a notification component such as a light, a vibrating element, etc.) to selectively activate or utilize these components. Additionally or alternatively, the engagement system 140 may provide a user interface that integrates with the host property — i.e., client application 130 — that includes one or more icons that may illuminate or otherwise notify the user of the products that may be of interest to them. All such variations are intended to fall within the scope of the present disclosure.

The communication circuit 148 is also structured to receive a response based on the communication. For example, the communication circuit 148 may provide a notification of one or more matched products that is provided via the client application 130. The user 101 may observe the product offer. The communication may also include one or more input vehicles (a button, a link, etc.) provided on the graphical user interface (GUI) of the host property. For example, the product may be shown on the GUI with a button that enables the user to click or tap it to achieve the product instantly or fairly instantly. The button may include a "yes" or "no," which allows the user to click yes or no. If yes is selected, in one embodiment, the product is instantly provided to the user. In this embodiment, the engagement system client application 140 may store one or more predefined products of interest for the user whereby such products simply need to be activated to be used. In another embodiment, the communication circuit 148 sends a notification either directly or via the engagement system 138 to the third party computing system 152 to retrieve the product. In yet another embodiment, the partnership database stores the product such that the retrieval message is sent from the communication circuit 148 to the engagement system 138. In any event, the near real time fulfillment of these products is accomplished. If no is selected, the communication circuit 148 may provide this information to the matching circuit 146 for the matching circuit 146 to curate future products for the user. Thus, the matching circuit 146 may utilize intelligence and machine learning to recognize products that may be of interest and not interest for the user based on their responses to one or more provided products.

Beneficially, via the communication circuit 148 and engagement system client application 140, products are offered and able to be accepted directly in the host application (i.e., host property). Such a system enables the user to save time without having to visit various merchants or third parties, enables the merchant or third party to push their products to consumers who may be interested in them, and otherwise continues to promote engagement with the host application.

Figure 3:
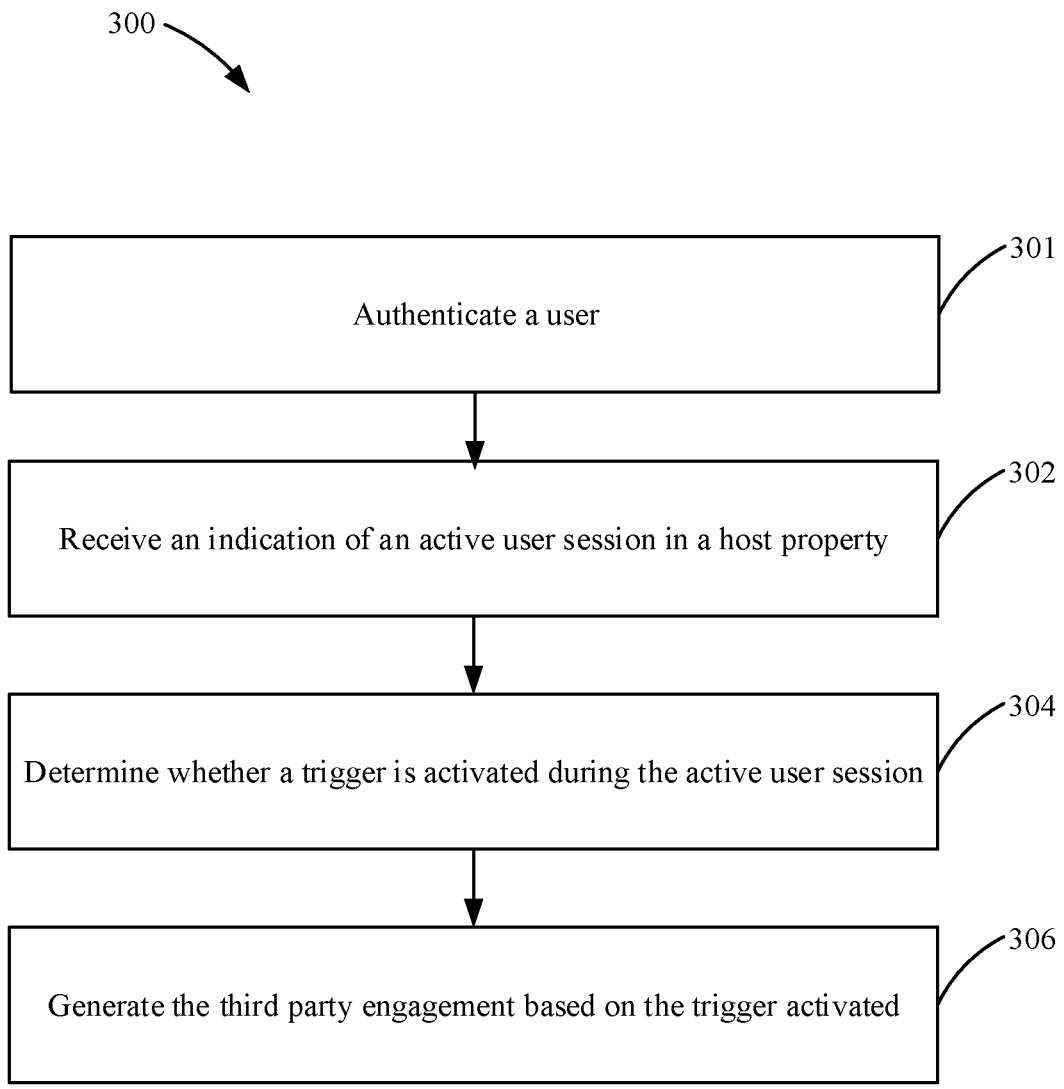
FIG. 3 is a flow diagram of a method of providing a third party engagement in a host property, according to an example embodiment.

Referring to FIG. 3, a flow diagram of a method 300 of providing a third party engagement in a host property is described according to an example embodiment. The third party engagement may include a third party offer, product, service, stored value card, loyalty card, etc. In some arrangements, the third party engagement may be generated and/or provided in real-time or near real-time. In other arrangements, the artificial intelligence system 100 may be configured to access a plurality of accounts of a customer that are spread across multiple provider institutions that may or may not be affiliated with the provider institution 172. Method 300 may be performed by the components of FIGS. 1-2, such that reference may be made to them in explaining the method.

Prior to the provisioning of a third party engagement in a host property, a user may be authenticated into the host property (i.e., client application 130) at 301. In some examples, prior to allowing the user to engage with the host property, the user may be authenticated as an account holder. The user may be authenticated based on authentication credentials of that user. The user can be identified and authenticated based on the application associated with the provider computing system 172 such that the provisioning of additional identification information or account information by the user is not required. The user authentication data may include any of a password, a PIN (personal identification number), a user ID, an answer to a verification question, a biometric, an identification of a security image, or a combination thereof. The client application 130 compares the received authentication data with known and verified user authentication data. If the authentication data provided does not match the known and verified user authentication data, the user is not authenticated. If the authentication data provided matches the known and verified user authentication data, the user is authenticated such that the user may freely or substantially freely (there may be additional security protocols provided that control the use of certain functions within the host property) use the host property.

At 302, the engagement system client application 140 (e.g., via the communication circuit 148) receives an indication of an active user session in a host property (e.g., a digital wallet and/or application associated with a computing system 172 such as, but not limited to, a provider computer system associated with a financial institution). For example, a user initiates, activates, or otherwise enters a user session in their digital/mobile wallet. In examples in which the user device 110 includes a host property (e.g., an application) associated with the provider computing system 172, the user authentication data (e.g., data indicative of the identity of a user of the provider institution and/or a user of various systems, applications, and/or products of the provider institution) received and/or transmitted to the computing system 172 may provide an indication of an active user session in the host property (e.g., a digital wallet). For example, the user authentication data may indicate that the user is logged into the host property. The host property may be associated with or otherwise communicatively coupled to one or more third party systems 150 (e.g., one or more third party providers). In some examples, the engagement system client application 140 may be structured to monitor user activity, user account information, user financial information, spending patterns, etc. such that the user activity may indicate that the user is engaged in an active user session.

In some examples, the engagement system client application 140 is further structured to determine whether a trigger is activated during the active user session at 304. The "trigger" refers to an indication of when and if an offering of third-party products and/or services should be made from within the host property. In other words, a "trigger" refers to a prompt for providing one or more third-party products.

The trigger may comprise an indication of an active enrollment/use of the host property (e.g., an enrollment at, during, and/or after the point of sale). For example, while the user is engaged in a transaction either in a physical store or online (e.g., the user is checking out), the engagement system client application 140 may determine that the user is not enrolled in the loyalty program provided by the third party provider (e.g., a merchant). The engagement system client application 140 may cross-reference the user account information associated with the computing system 172 against the known users associated with the third party provider to determine whether the user is enrolled in or otherwise associated with a product, service, and/or offer provided by the third party provider. In response to the determination that the user is not associated with a product, service, and/or offer provided by the third party provider (e.g., the user is not enrolled in the loyalty program), the engagement system client application 140 may generate a third party engagement to provide the user the option to associate with a product, service, and/or offer provided by the third party provider (e.g., the option to enroll in a loyalty program associated with the third party provider) based on the trigger comprising the active enrollment.

In some examples, the trigger may comprise a passive enrollment (e.g., an enrollment based on transactions associated with a user account). The matching circuit 146 may be structured to analyze transactions (e.g., transaction history, trends, etc.) such that the trigger is based on one or more transactions of a user. For example, the engagement system client application 140 may analyze the transactions associated with a user account to determine where the user shops and, in turn, provide a third party engagement to the user (e.g., the engagement system 140 may provide an offer to the user device 110 that asks the user to join a loyalty program provided by a merchant the user shops at). Then, at various predetermined times, the third party offer may be provided to the user within the host application. This is a passive enrollment because the offer is based on analyzed data and provided without a true activator as compared to the recognition of being at a POS device of a merchant and then offering a product to the user while he/she is at the POS device (i.e., active enrollment).

Alternatively or additionally, as described above, the trigger may comprise a location based on the location of a user device 106 comprising the host property (e.g., the digital wallet). For example, while the user is engaged in a transaction at the point of sale (e.g., the user is checking out), the engagement system 140 may determine the location of the user. The engagement system client application 140 may utilize geolocation to determine that the user is located at a third party provider and, in turn, provide the user the option to associate with a product, service, and/or offer provided by the third party provider. For example, the engagement system client application 140 may utilize geolocation to facilitate enrollment of the user in a loyalty program (e.g., to ask the user if they want to provision a stored value card) provided by the third party provider. The engagement system client application 140 may determine that the user is at or near a third party provider. While the user is at or near a particular location (e.g., a third party provider location), the engagement system client application 140 may generate a third party engagement (e.g., a third party offer, stored value card, loyalty card, etc.) based on the trigger comprising a location.

The engagement system client application 140 may be structured to provide an indication of the activation of a trigger (e.g., an active, passive, and/or location based trigger) to facilitate and/or enable the showing of a third party engagement (e.g., a product, offer, or service, etc.) to the user from within the host application.

The engagement system 140 may be structured to generate a third party engagement based on the trigger activated at 306. As mentioned above, the third party engagement may be provided via the graphical user interface comprising the host property (e.g., a digital wallet). The third party engagement may be generated in real-time or near real-time such that the user device 110 may be structured to receive the third party engagement based on a trigger activated during the active user session.

As mentioned above, the engagement system 140 may receive, via graphical user interface comprising the host property, an indication of activation of the third party engagement. For example, the user may provide an indication of activation by clicking a link, button, icon, image, etc. via the user device 110. In one embodiment, the product may be utilized immediately. This is due to the product being provided by the product circuit 162 to the engagement system 138 for use. In another embodiment, a communication may need to be sent to the third party computing system 152 to inform them of the acceptance before it is ready for use. In either situation, a communication may be provided from the communication circuit of the engagement system 140 to the third party computing system 152 for them to update their records in the account database 160 of an enrollment with the product such that the friction that may be present for a user to start using the product is reduced/diminished. The engagement system 138 directly or the engagement system 140 may transmit data associated with the user to the third party 150 to enroll the user in or otherwise associate the user with the third party engagement (e.g., a third party product or service). In some examples, the engagement system 138 or engagement system client application 140 may be structured to auto-fill the enrollment data via the user device 110 comprising the graphical user interface. The user device 110 and/or the engagement system 138 may receive the enrollment data via an application program interface (API), which may be transmitted to the one or more third parties. For example, a digital form, field, etc. included in the graphical user interface may include user data, user account information, etc. that is pre-filled such that the user is not required to input or provide data to complete acceptance of a third party engagement. This may save time and be appealing to the user.

In response to receiving the indication of activation of the third party engagement, the third party system 150 may generate a product, such as the digital stored value card. Alternatively and as described above, the product — the stored value card —may be pre-generated and automatically given to the customer. The digital stored value card may be associated with a third party user account (e.g., a third party loyalty program account). In some examples, the digital stored value card may be displayed via a graphical user interface associated with the host property. Alternatively or additionally, various features (e.g., balance information, rewards, etc.) associated with the digital stored value card may be displayed via a graphical user interface associated with the host property. The engagement system 140 may transmit data to and/or receive data from one or more application program interfaces (APIs) associated with various third party systems. For example, the engagement system 140 may transmit a call, via an API, to receive and/or display rewards information in real-time or near real-time in the host property of the user device 110.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may be or include hardware structured to execute the functions described herein. Alternatively and as described above according to certain configurations, each respective "circuit" may be machine-readable media (e.g., code, programmable code, etc.).

In the hardware configuration, the circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Thus, in certain embodiments, the circuits of the engagement system client application 140 may be hardware components included with or separate from the user device 110. In this embodiment, these circuits may be structured as described above.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

For the purpose of this disclosure, the terms "coupled" or "couple" means the joining of two members directly or indirectly to one another. In this regard, component A may be referred to as being "coupled" to component B even if component C is an intermediary, and component A exchanges information with component B (e.g., data, commands, values, signals, etc.) via component C. Thus and in this example, there may or may not be a direct physical connection (e.g., an electrical connection) between component A and component B; yet, for the purposes of this disclosure, these components are still considered "coupled."

What is claimed is:

1. A user device, comprising:
   a display device;
   a location positioning system; and
   a processing circuit having at least one processor coupled to at least one memory storing instructions that, when executed by the at least one processor, cause the processing circuit to:
      authenticate a user via a host property application associated with a host property provider computing system such that additional authentication information for a third party that provides a third party engagement specific to the user is not required;
      receive partnership information regarding one or more products offered by one or more participating third parties from the host property provider computing system, wherein the partnership information is stored in the at least one memory and is periodically updated;
      match the user to a loyalty program offered by the third party by identifying the third party from a list of participating third parties and the loyalty program from the partnership information based on transaction data associated with the user;
      predict an upcoming location of the user based on a predictive analysis of previous locations visited by the user;
      determine that a location of the third party is at or near the predicted upcoming location;
      determine that the user is unassociated with the third party at or near the predicted upcoming location;
      via the location positioning system, determine that the user device is at or near the predicted upcoming location;
      prompt, via a graphical user interface presented by the display device, the user to associate with the third party at the predicted upcoming location;
      responsive to the prompt, receive, via the graphical user interface presented by the display device, a user input to associate with the third party at the predicted upcoming location;
      provide an indication of an active user session associated with the host property application to the host property provider computing system;
      receive a third party loyalty program engagement specific to the user and associated with the loyalty program offered by the third party based on a trigger being activated during the active user session, the trigger comprising an indication that the user device is engaged with the third party in a transaction at a point of sale device associated with the third party, wherein the trigger is structured to generate the third party loyalty program engagement specific to the user, and wherein the third party loyalty program engagement specific to the user is determined based on the determination that the user device is at or near the predicted upcoming location, the association of the user with the third party, and the matching of the user to the loyalty program offered by the third party;
      provide, via the graphical user interface presented by the display device, the third party loyalty program engagement specific to the user based on the trigger being activated during the same active user session;
      receive, via the graphical user interface presented by the display device, a selection of the third party loyalty program engagement specific to the user;
      auto-fill enrollment data of the user in a field of the graphical user interface via an application program interface (API) based on the received selection, wherein the enrollment data comprises account information stored in an account database of the host property provider computing system;
      receive, via the graphical user interface presented by the display device, an acceptance of the auto-filled enrollment data of the user; and
      transmit the received acceptance regarding the auto-filled enrollment data of the user to a third party computing system associated with the third party to complete an acceptance of the third party loyalty program engagement specific to the user.

2. The user device of claim 1, wherein the instructions further cause the processing circuit to provide an indication of activation of the third party engagement to a third party system associated with the third party loyalty program engagement.

3. The user device of claim 1, wherein the third party loyalty program engagement is at least one of a loyalty card and a digital stored value card.

4. The user device of claim 1, wherein the third party loyalty program engagement is provided in real-time or near real-time.

5. The user device of claim 1, wherein the providing of the third party loyalty program engagement includes at least one of providing the third party loyalty program engagement as a pop-up within the host property application, a text message associated with the third party loyalty program engagement, and a push notification.

6. A computing system for providing a third party engagement in a host property application, the system comprising:
   a provider computing system communicatively coupled to a user device, the provider computing system structured to:
      receive an indication of an authentication of a user from the host property application, such that additional authentication information for a third party that provides a third party engagement specific to the user is not required;
      match the user to a loyalty program offered by the third party by identifying the third party from a list of participating third parties based on transaction data associated with the user;
      predict an upcoming location of the user based on a predictive analysis of previous locations visited by the user;
      determine that a location of the third party is at or near the predicted upcoming location;

determine that the user is unassociated with the determined third party at or near the predicted upcoming location;

via a location positioning system of the user device, determine that the user device is at or near the predicted upcoming location;

prompt, via a graphical user interface presented by a display device of the user device, the user to associate with the third party at the predicted upcoming location;

responsive to the prompt, receive, via the graphical user interface presented by the display device of the user device, a user input to associate with the third party at the predicted upcoming location;

receive an indication of an active user session associated with the host property application;

determine a trigger is activated during the active user session, the trigger comprising an indication that the user device is engaged with the third party, wherein the engagement with the third party is a transaction at a point of sale device associated with the third party, wherein the trigger is structured to generate a third party loyalty program engagement specific to the user and associated with the loyalty program offered by the third party, and wherein the third party engagement specific to the user is determined based on the determination that the user device is at or near the predicted upcoming location, the association of the user with the third party, and the matching of the user to the loyalty program offered by the third party;

generate the third party loyalty program engagement specific to the user and associated with the loyalty program offered by the third party based on the trigger being activated during the same active user session; and provide, via the graphical user interface presented by the display device of the user device, the third party loyalty program engagement specific to the user during the same active user session.

7. The system of claim 6, wherein the host property application is a mobile wallet application.

8. The system of claim 6, wherein the third party loyalty program engagement is a loyalty card.

9. The system of claim 6, wherein the third party loyalty program engagement is a stored value card.

10. The system of claim 6, wherein the third party loyalty program engagement is generated in real-time or near real-time.

11. The system of claim 6, wherein the provider computing system is further structured to identify the third party loyalty program engagement from a plurality of potential third party engagements based on information regarding the user that is indicative of at least one of a merchant and a product that the user has visited and bought in a past timeframe.

12. A computer implemented method of providing a third party engagement in a host property application, the method comprising:

receiving an indication of an authentication of a user of and from the host property application such that additional authentication information for a third party that provides a third party engagement specific to the user is not required;

receiving partnership information regarding one or more products offered by one or more participating third parties from a host party application computer system, wherein the partnership information is stored on a user device associated with the user;

matching the user to a loyalty program offered by a third party by identifying the third party and the loyalty program from the partnership information based on transaction data associated with the user of the host property application;

predicting an upcoming location of the user of the host property application based on a predictive analysis of previous locations visited by the user;

determining that a location of the third party is at or near the predicted upcoming location;

determining that the user is unassociated with a third party at or near the predicted upcoming location;

via a location positioning system of the user device associated with the user of the host property application, determining that the user device is at or near the predicted upcoming location;

prompting, via a graphical user interface presented by a display device of the user device, the user to associate with the third party at the predicted upcoming location;

responsive to the prompt, receiving, via the graphical user interface presented by the display device of the user device, a user input to associate with the third party at the predicted upcoming location;

receiving an indication of an active user session associated with the host property application;

determining a trigger is activated during the active user session, the trigger comprising an indication that the user device is engaged with the third party, wherein the engagement with the third party is a transaction at a point of sale device associated with the third party, wherein the trigger is structured to facilitate generation of a third party loyalty program engagement specific to the user and associated with the loyalty program offered by the third party, and wherein the third party loyalty program engagement specific to the user is determined based on the determination that the user device is at or near the predicted upcoming location, the association of the user with the third party, and the matching of the user to the loyalty program offered by the third party;

generating the third party loyalty program engagement specific to the user and associated with the loyalty program offered by the third party based on the trigger being activated during the same active user session; and providing, via the graphical user interface presented by the display device of the user device, the third party loyalty program engagement specific to the user during the same active user session.

* * * * *